(12) United States Patent
Masse (10) Patent No.: US 10,693,710 B2
(45) Date of Patent: Jun. 23, 2020

(54) CORRELATION ENGINE COMPRISING ROOT CAUSE AND SERVICE IMPACT ANALYSES (71) Applicant: Hewlett Packard Enterprise Development LP, Houston, TX (US)

(72) Inventor: Pierre Masse, Mougins (FR)

(73) Assignee: Hewlett Packard Enterprise Development LP, Houston, TX (US)

(*) Notice: Subject to any disclaimer, the term of this patent is extended or adjusted under 35 U.S.C. 154(b) by 78 days.

(21) Appl. No.: 15/329,784

(22) PCT Filed: Feb. 6, 2015

(86) PCT No.: PCT/US2015/014724
§ 371 (c)(1),
(2) Date: Jan. 27, 2017

(87) PCT Pub. No.: WO2016/025024
PCT Pub. Date: Feb. 18, 2016

(65) Prior Publication Data
US 2017/0222867 A1 Aug. 3, 2017

(30) Foreign Application Priority Data

Aug. 14, 2014 (EP) .................... 14306276

(51) Int. Cl.
H04L 12/24 (2006.01)
(52) U.S. Cl.
CPC ........ H04L 41/0631 (2013.01); H04L 41/065 (2013.01); H04L 41/22 (2013.01);
(Continued)

(58) Field of Classification Search
None
See application file for complete search history.

(56) References Cited

U.S. PATENT DOCUMENTS 5,761,502 A 6/1998 Jacobs
5,768,501 A 6/1998 Lewis
(Continued)

FOREIGN PATENT DOCUMENTS

EP 1460801 9/2004
WO WO-0074314 12/2000
(Continued)

OTHER PUBLICATIONS

European Patent Office, "Extended European Search Report", Application 14306276.8, dated Feb. 2, 2015, 12 pages.
(Continued)

Primary Examiner — James A Edwards (57) ABSTRACT

A network correlation engine (CE-1) to be coupled to a telecommunication network (NT) comprising at least one network section (Sm) to supply at least one event notification (Am) upon detection of an event relating to the section. The correlation engine comprises at least one event analysis block (Bn) comprising at least a root cause analysis module (RCn) to receive on input the event notification and to supply on output a root cause analysis result (RRn) and a service analysis module (SAn) to receive on input the root cause analysis result from the root cause analysis module of the block is and to supply on output a service impact analysis result (SRn).

19 Claims, 5 Drawing Sheets (52) U.S. Cl.
CPC .............. *H04L 41/24* (2013.01); *H04L 41/00* (2013.01); *H04L 41/5032* (2013.01)

(56) References Cited

U.S. PATENT DOCUMENTS

| | | | |
|---|---|---|---|
| 6,766,368 B1* | 7/2004 | Jakobson | ............ H04L 41/0233 367/39 |
| 7,092,707 B2 | 8/2006 | Lau et al. | |
| 7,293,287 B2 | 11/2007 | Fischman et al. | |
| 7,769,847 B2 | 8/2010 | Lewis | |
| 7,796,500 B1 | 9/2010 | Elliott et al. | |
| 2001/0014886 A1* | 8/2001 | Ross | ................... H04L 41/0631 706/45 |
| 2008/0114874 A1 | 5/2008 | Meir et al. | |
| 2008/0276253 A1 | 11/2008 | Khandrika et al. | |
| 2009/0279551 A1 | 11/2009 | Wong et al. | |
| 2013/0218354 A1 | 8/2013 | Andres et al. | |
| 2013/0227103 A1* | 8/2013 | Garimella | ........... H04L 41/5054 709/223 |
| 2014/0136690 A1* | 5/2014 | Jain | ..................... H04L 41/5012 709/224 |

FOREIGN PATENT DOCUMENTS

| | | |
|---|---|---|
| WO | WO-0206971 | 1/2002 |
| WO | WO 2012041555 | 4/2012 |
| WO | WO-2012143059 | 10/2012 |

OTHER PUBLICATIONS

International Searching Authority, "Notification of Transmittal of the International Search Report and the Written Opinion", PCT/US2014/014724, dated Apr. 29, 2015 12 pages.

Miyazawa, M.et al.; "Real-Time Root Cause Analysis in Oss for a Multilayer and Multi-Domain Network Using a Hierarchical Circuit Model and Scanning Algorithm", KDDI R&D Laboratories Inc IEE 2009 4 pages.

* cited by examiner

CORRELATION ENGINE COMPRISING ROOT CAUSE AND SERVICE IMPACT ANALYSES

BACKGROUND

A telecommunication network is generally comprised of a large number, sometimes millions, of network elements. These network elements are provided by different vendors, each specialized in different domains and layers, such that the entire network is quite heterogeneous. The network elements are usually self-monitored, so as to detect a failure and notify the failure by means of fault information.

A network operator or provider is responsible for an infrastructure comprising many network elements. It is therefore helpful for the provider, monitoring the infrastructure, to be able to rapidly identify the root cause of a failure and the affected services so that they may be repaired in order to ensure a high quality of service and to meet service contracts.

DETAILED DESCRIPTION

Since network elements are generally interconnected, a failure of one element affects the others; as each element is self-monitored, a flood of information may result.

Root cause analysis is thus employed to determine the network element that caused the failure as opposed to the network element(s) merely reacting to the failure. A "Trouble Ticket" is then issued so that the failure may be fixed, either automatically or by a human technician. The Trouble Ticket should thus identify the failure as accurately as possible, to save time and resources. On the contrary, service impact analysis is used to determine the impact of such a failure, either on the physical components themselves or on logical services, generally in order to understand the impact on a service contract.

A correlation engine may be used to provide root cause or service impact analysis. A correlation engine is thus coupled to a domain on input, and generally supplies Trouble Tickets or status indicators on output. These correlation engines have varying complexities and efficiencies, and may be hard to adapt to an evolving network.

Figure 1:
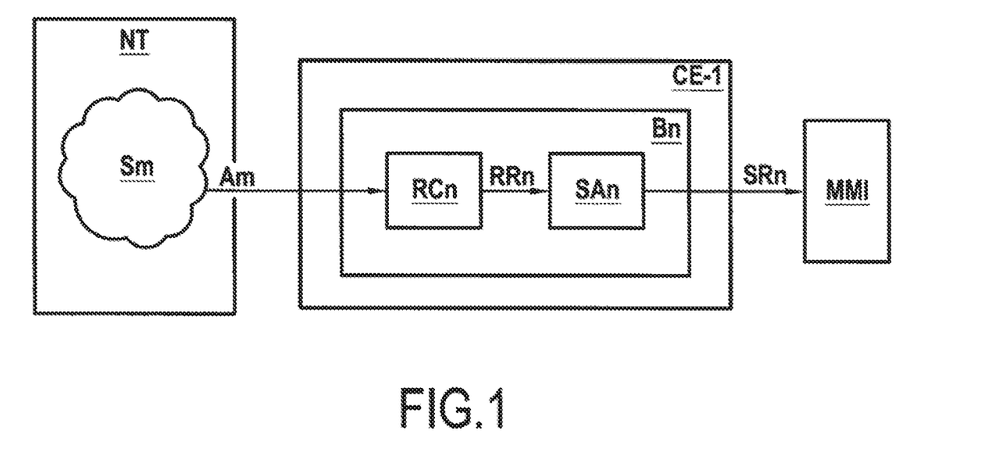
FIG. 1 schematically shows a first example correlation engine.

FIG. 1 schematically shows a first example correlation engine CE-1. The correlation engine CE-1 is coupled to a telecommunications network NT comprising a section Sm supplying an "event notification" or alarm Am. The correlation engine CE-1 comprises a block Bn receiving on input the alarm Am. The block Bn comprises a Root Cause Analysis (RCA) module RCn and a Service Impact Analysis (SIA) module SAn. In this example, m is a section index from 1 to M and n is a block index from 1 to N. It may, be noted that m may equal n in some cases.

According to this example, the module RCn supplies a root cause analysis result (or "root result") RRn to its corresponding module SAn, and the module SAn supplies a service impact analysis result (or "service result") SRn. The root result RRn is used to describe the physical component to be repaired in relation with the Trouble Ticket, so that it may be fixed as quickly as possible, while the service result SRn relates to the status of a service, such as Degraded or Unavailable. The service result SRn may be supplied to a man-machine interface MMI (such as a Graphical Interface/Topology Viewer) or another tool used to manage Service Level Agreements SLAs, which are the contracts used to define the Quality of Service between a network operator and a client, for example requiring full availability of the service 99% of the time. The service result can be used to notify a client what services are affected, to what extent (Degraded, Unavailable, etc), and the status of the repair.

In this manner, the module SAn is able to exploit the results of the module RCn, since the advantages of root cause analysis (efficient alarm grouping, trouble ticket management, problem alarm generation, and root cause analysis) correspond to the disadvantages of service impact analysis (poor alarm grouping and generation, poor Trouble Ticket management and root cause analysis), and the disadvantages of root cause analysis (poor service impact analysis and topology enrichment) correspond to the advantages of service impact analysis (good service impact analysis and topology enrichment).

Figure 2:
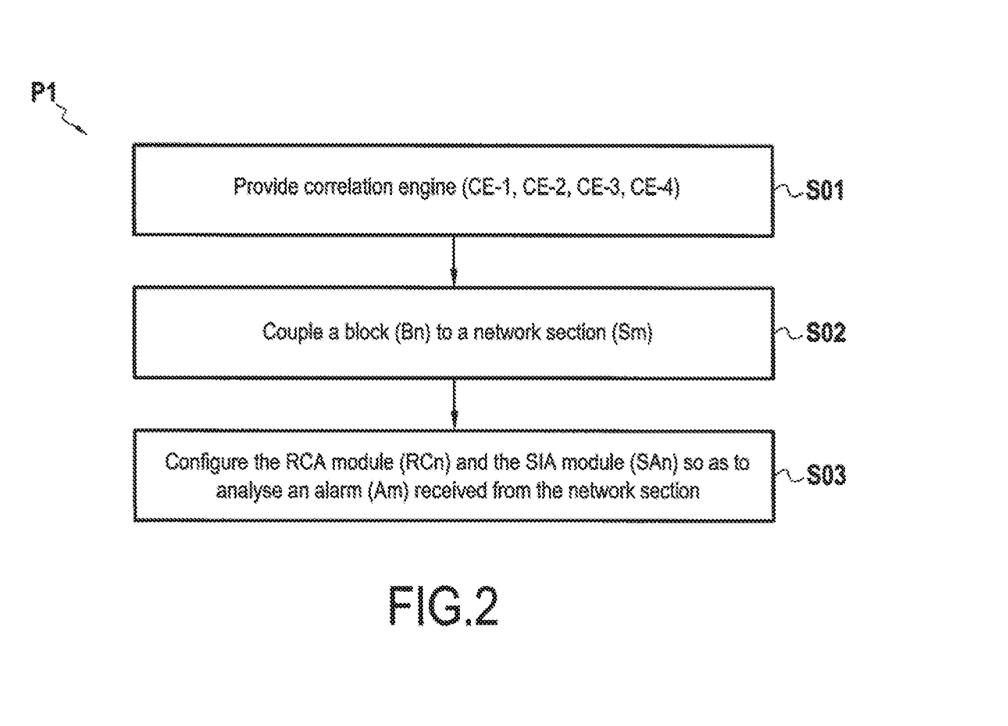
FIG. 2 is a flow chart showing an example method of implementing a correlation engine.

FIG. 2 is a flow chart showing an example method of implementing a correlation engine according to the first example shown in FIG. 1. In a step S01, a correlation engine CE-1 is provided. In a step S02, a block Bn of the correlation engine is coupled to a network section Sm. In a step S03, the RCA module RCn and the SIA module SAn of the block are configured so as to analyse an alarm Am received from the network section.

Figure 3:
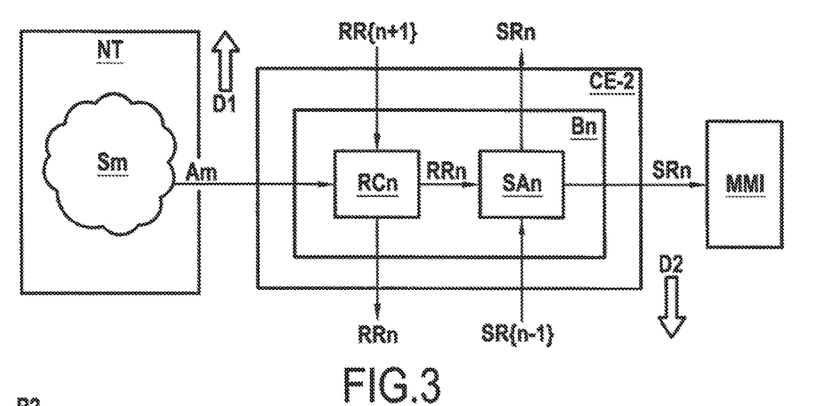
FIG. 3 schematically shows a second example correlation engine.

FIG. 3 schematically shows a second example correlation engine CE-2. The correlation engine CE-2 corresponds to the correlation engine CE-1 described in relation with FIG. 1, with the following additions:

The service impact analysis module SAn further:
 supplies on output the service result SRn to a module SA{n+1} belonging to a block B{n+1} arranged in a first direction D1; and
 receives on input a service result SR{n−1} from a module SA{n−1} belonging to a block B{n−1} arranged in a second direction D2, opposite the first direction D1.
The root cause analysis module RCn further:
 supplies on output the root result RRn to a module RC-{n−1} belonging to a block B{n−1} arranged in the second direction D2; and
 receives on input a root result RR{n−1} from a module RC{n+1} belonging to a block B{n+1} arranged in the first direction D1.

Figure 4:
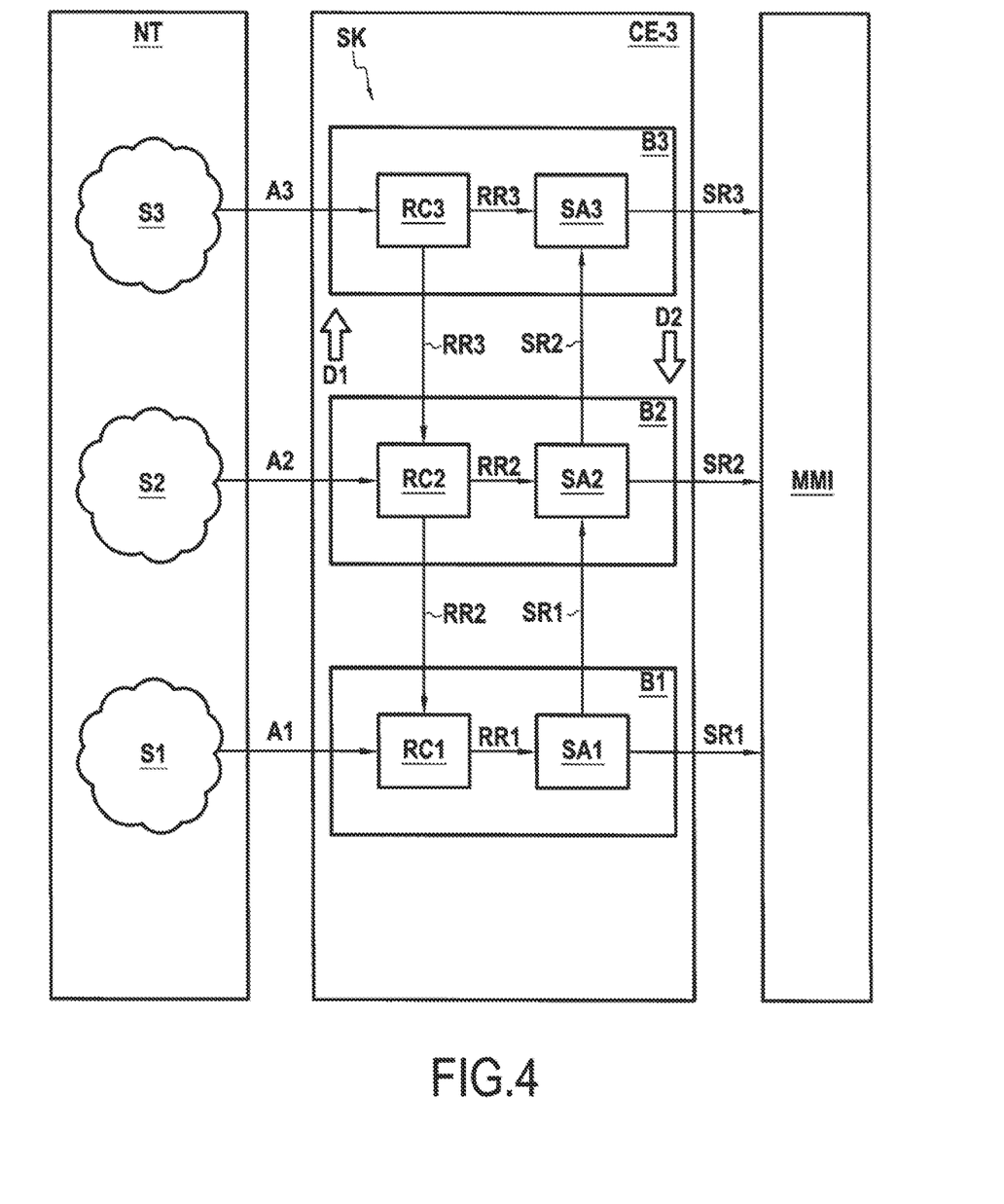
FIG. 4 schematically shows a third example correlation engine.

It is to be noted that the results have been here described as being received from/provided to the nearest neighbor {n±1}, but as will be seen in relation with FIG. 4, they may be instead or additionally provided to further neighbors. Thus, it may be generalized as {n±x} wherein x is an integer greater than or equal to 1.

The capability to provide and receive the root cause and service impact results from other blocks will now be described in further detail with respect to FIG. 4.

FIG. 4 schematically shows a third example correlation engine CE-3. In this example, the correlation engine CE-3 is coupled to a network NT comprising a total M equals three sections Sm (S1, S2, S3). Each section Sn supplies an alarm Am (A1, A2, A3).

The correlation engine CE-3 comprises a stack SK of three blocks Bn (B1, B2, B3), each comprising an RCA module RCn (RC1, RC2, RC3) and a SIA module SAn (SA1, SA2, SA3) respectively.

It may be rioted that in the first direction D1 the index numbers n are increasing 1 to 3, and in the second direction D2 the index numbers n are decreasing 3 to 1.

According to one embodiment, when configuring the correlation engine, the blocks are configured and arranged such that the increasing indices correspond to blocks less to more logically defined, and the decreasing indices correspond to blocks less to more physically defined. That is to say, the lower index numbers n of the stack SK of blocks allow a more detailed analysis of the problem itself, whereas the higher index numbers of the stack SK allow a more global view of the effects.

In this example, one block, for example block 82, was already configured as shown in relation with FIG. 2, when it was desired to add two blocks to support new sections, one block (B3) of a higher logical level, and one block (B1) of a lower logical level. Blocks B1 and B3 are thus configured and coupled to block B2.

Block B1

The module RC1 receives the alarm A1 and the root result RR2 from the module RC2 of block B2, and supplies the root result RR1 to its corresponding module SA1. The module SA1 receives the root result RR1, supplies the service result SR1 to the module SA2 of block B2 and to the interface MMI.

Block B2

The module RC2 receives the alarm A2 and the root result RR3 from the module RC3 of block B3, and supplies the root result RR2 to the module RC1 of block B1 and to its corresponding module SA2. The module SA2 receives the root result RR2 and the service result SA1 from the module SA1 of block B1, and supplies a service result SR2 to the module SA3 of block B3 and to the interface MMI.

Block B3

The module RC3 receives the alarm A3, and supplies the root result RR3 to the module RC2 of block B2 and to its corresponding module SA3. The module SA3 receives the root result RR3 and the service result SR2 from the module SA2 of block B2, and supplies the service result SR3 to the interface MMI.

In this example, blocks B1 and B3 are both "end blocks" of the stack SK, coupled to another block on only one side. Block B1 is both the first block in the first direction D1 and the last block in the second direction D2, and block B3 is both the last block in the first direction D1 and the first block in the second direction D2. Block 82 is an "intermediary block" of the stack SK, coupled on both sides to other blocks.

The root cause analysis results RRn from one logical level {n} are provided to an analysis block of a lower logical level {n−1}, to aid it in determining the root cause of an event. In this manner, the causes of an event are grouped to determine the cause of an issue, that is to say, the physical component that has malfunctioned. The service impact analysis results SAn from one logical level {n} are provided to an analysis block of a higher logical level {n}, to aid it in determining the service impact of an event, which may either be due to a lower logical level, or the root cause result of the same block.

It is to be understood that the first direction D1 and second direction D2 may be reversed, with the direction of the flow of results RRn, SAn also reversed correspondingly, such that the blocks at the bottom of the stack are more logically defined.

The correlation engine CE-3 thus provides a flexible solution to dividing the complexity of the network into multiple sections (for example domains or layers), depending on the technology implemented, the vendors, etc. Further, each section Sm is associated with at least one block Bn providing both root cause analysis and service impact analysis. Each block Bn is thus configured for a limited set of correlation rules, simplifying its implementation, as the RCA module and the SIA module of each block Bn are adapted to the section Sm to which the block is coupled. Blocks Bn may be added, modified, and removed as needed, so that the entire network NT is managed.

The correlation engine CE-3 is thus relatively simple to implement; since each block is independent of the others, the implementation of the root cause analysis and service impact analysis for a section is also independent, unaffected by correlation challenges of the other sections. To support new sections, a developer need simply insert one or more blocks into the correlation engine, and reconfigure the result routing accordingly.

Adding blocks at the bottom of the stack SK (in the second direction D2) provides more accurate results of the fault. Adding blocks at the top of the stack SK (in the first direction D1) provides a more accurate view of the impacted services.

It may nevertheless be noted that wording to one embodiment, a correlation engine may comprise a stack of blocks according to that described in relation with FIG. 1, wherein the results (root cause analysis and service impact analysis) are not shared between blocks.

Figure 5:
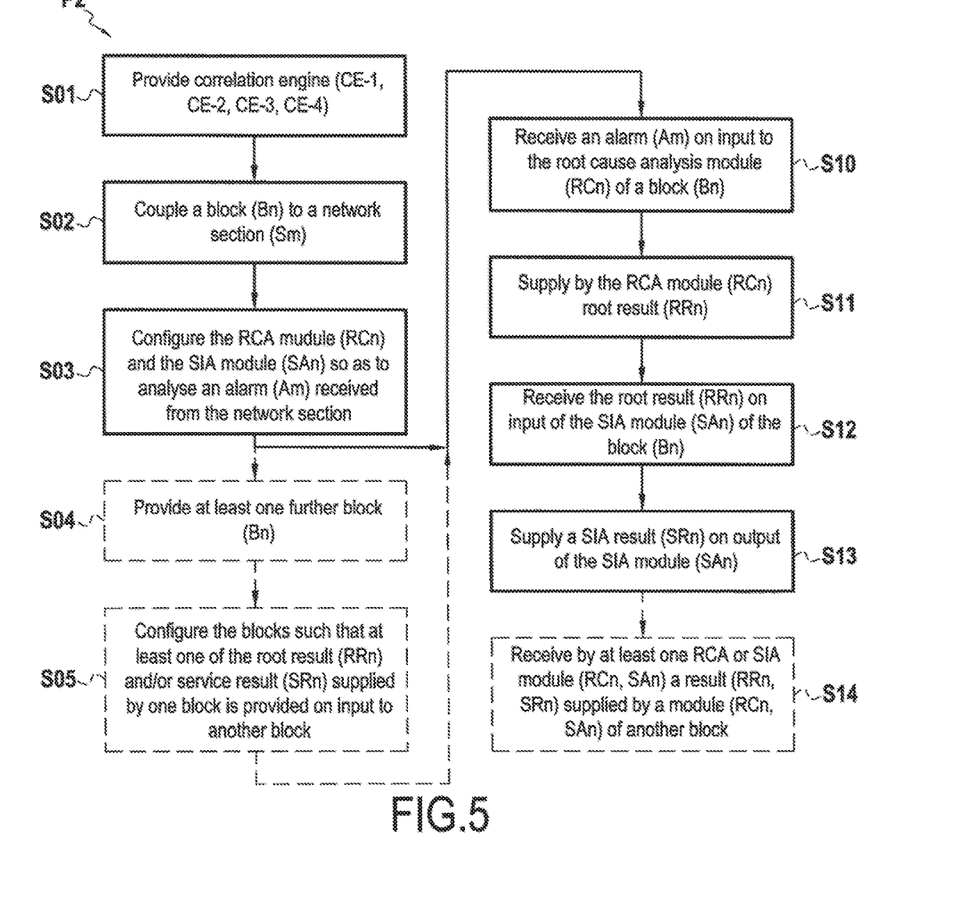
FIG. 5 is a flow chart showing further steps of an example method of implementing a correlation engine.

FIG. 5 is a flow chart showing further steps of a method P2 of implementing a correlation engine according to the examples shown in FIG. 3 or 4, in a step S01, a correlation engine (CE-1, CE-2, CE-3) is provided. In a step S02, a block Bn of the correlation engine is coupled to a network section Sm. In a step S03, the RCA module RCn and the SIA module SAn of the block are configured so as to analyse an alarm Am received from the network section.

According to one option, in a step S10, an alarm Am supplied by the network section Sm is received on input of the root cause analysis module RCn of the block Bn. In a step S11, the RCA module RCn supplies a root result RRn. In a step S12, the SIA module SAn of the block receives the root result RRn. In a step S13, the SIA module supplies a service result SRn.

According to one option, in a step S04, at least one further block Bn is provided, coupled to a network section, and configured. In a step S05, the blocks are configured such that at least one of the root result RRn or service result (SRn) supplied by one block is provided on input to another block.

According to another option, the method comprises steps S01 to S05, steps S10 to S13, and a step S14, wherein at least one RCA module RCn or SIA module SAn receives a result RRn, SRn, supplied by a module of another block.

Figure 6:
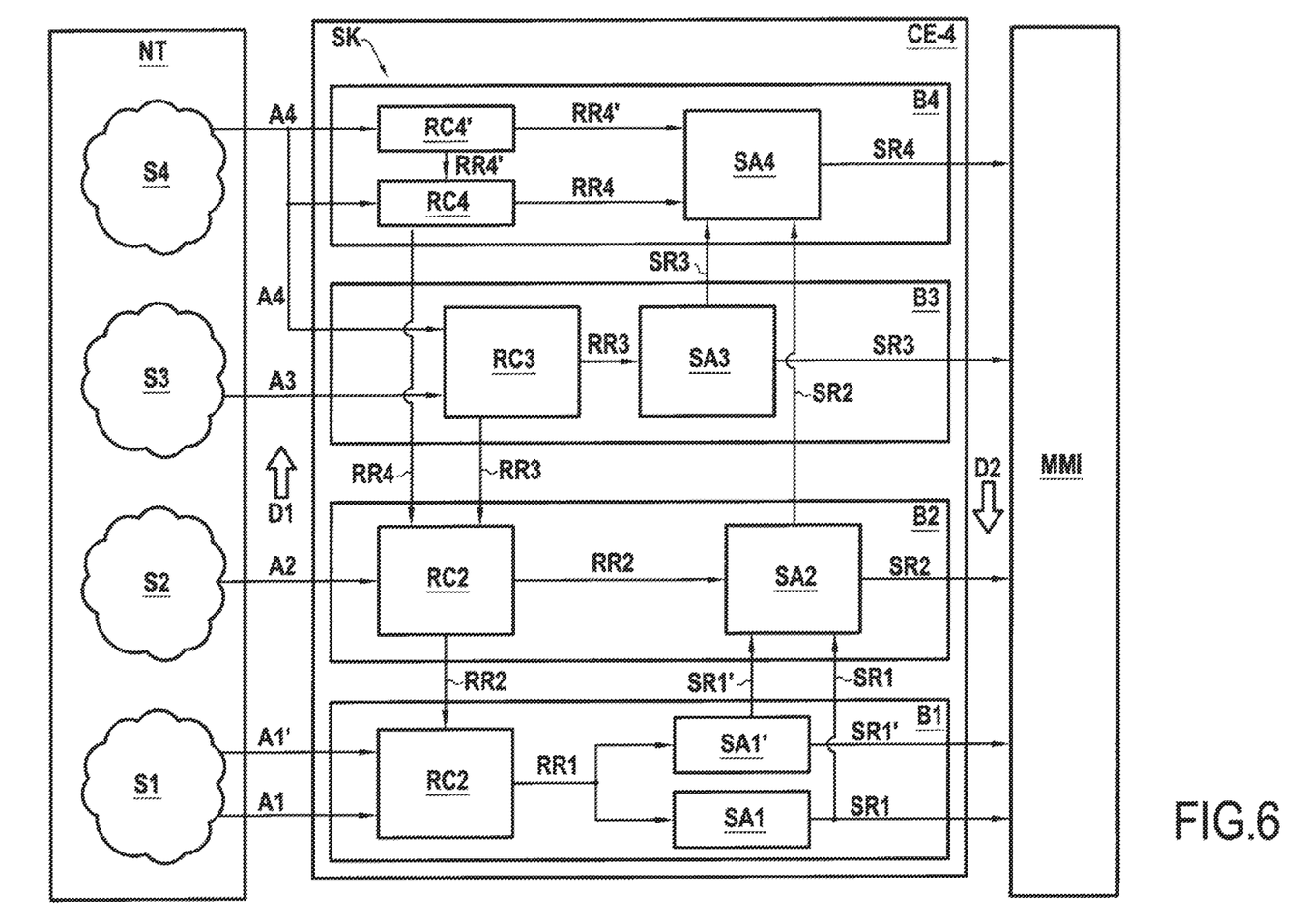
FIG. 6 schematically shows a fourth example correlation engine.

FIG. 6 schematically shows a fourth example correlation engine CE-4, grouping together various alternatives. It should be noted here that the provision of the following alternatives are all independent of each other, and are merely described together for the sake of convenience.

In this example, the correlation engine CE-1 is coupled to a network NT comprising a total M equals four sections Sm (S1, S2, S3, S4), each supplying at least one alarm Am (A1, A1', A2, A3, A4). The correlation engine CE-4 comprises a stack SK of four blocks Bn (B1, B2, B3, B4).

Block B1 comprises one module RC1, and two modules SA1, SA1'. The module RC1 receives alarms A1, A1' on input, and supplies a root result RR1 on output to modules SA1/SA1' respectively, Each module SA1, SA1' supplies service results SR1, SR1' on output to block B2 and to the interface MMI.

Block B2 comprises one module RC2 and one module SA2. The module RC2 receives the alarms A2 and root results RR3, RR4 on input, and supplies root results RR2 on output to module RC1 and to module SA2. Module SA2 further receives the service results SR1, SR1' on input, and supplies the service result SR2 on output to blocks B3, B4 and to the interface MMI.

Block B3 comprises one module RC3, and one module SA3. The module RC3 receives alarms A3, A4 on input, and supplies root result RR3 on output to module RC2 and to module SA3. Module SA3 further receives the service result SR2 on input, and supplies the service result SR3 on output to block B4 and to the interface MMI.

Block B4 comprises two modules RC4, RC4' and one module SA4. The module RC4' receives alarm A4 on input, and supplies root result RR4' on output to module RC4 and to module SA4. The module RC4 receives alarm A4 on input, and supplies root result RR4 on output to module RC2 and to module SA4. Module SA4 further receives the service results SR2, SR3 on input, and supplies the service result. SR4 on output to the interface MMI.

Thus, according to different embodiments:
a block comprises more than one RCE module and/or SIA module;
a root cause analysis result RRn and/or a service impact analysis result SRn is provided to more than one other block;
an RCA module and/or a SIA module to receive on input results from a plurality of other blocks;
a root cause analysis result RRn and/or a service impact analysis result SRn of a block Sn is not provided to/received from the nearest neighbour block {n+1} or {n−1}, but rather to/from a more distant block;
an RCA module receives alarms from a plurality of sections; and
an RCA module receives a plurality of alarms from a section.

In general, the correlation engine, its coupling to sections and to the interface MMI, and the contents and coupling of the blocks are configurable as needed.

The interface MMI is typically a management software, comprising a topographical viewer of the network, showing status of elements, alarms, interconnections, and so forth. It allows a network operator to get an overview of the network, spot problems, track trouble tickets, and the like. It may nevertheless be a simple display, print-out, and in general any other means of conveying information about the event notification and its cause and effect.

Figure 7:
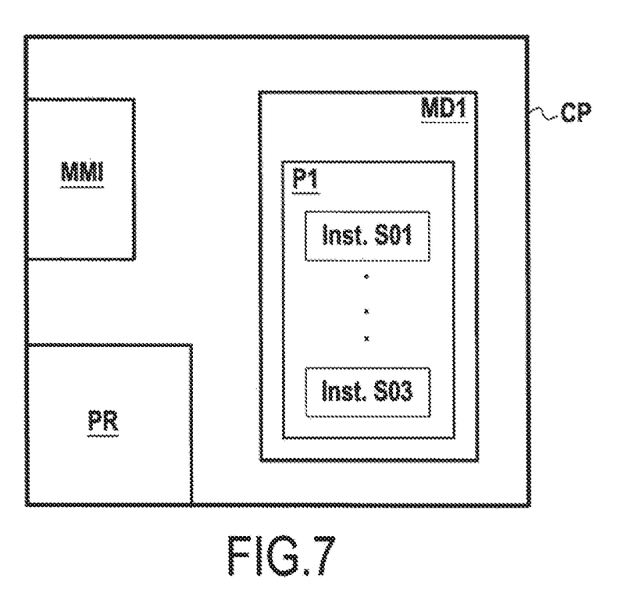
FIG. 7 schematically shows a computer comprising an example computer program.

FIG. 7 schematically shows a computer CP comprising a computer program P1 supplied on a medium MD1 readable by the computer. The computer CP further comprises a man-machine interface MMI and a processor PR configured to execute the program P1. The program P1 comprises instructions Inst. for carrying out the steps S01 to S03 of the method described in relation with FIG. 2. The program is preferably stored in a non-transitory manner on the medium MD1.

Figure 8:
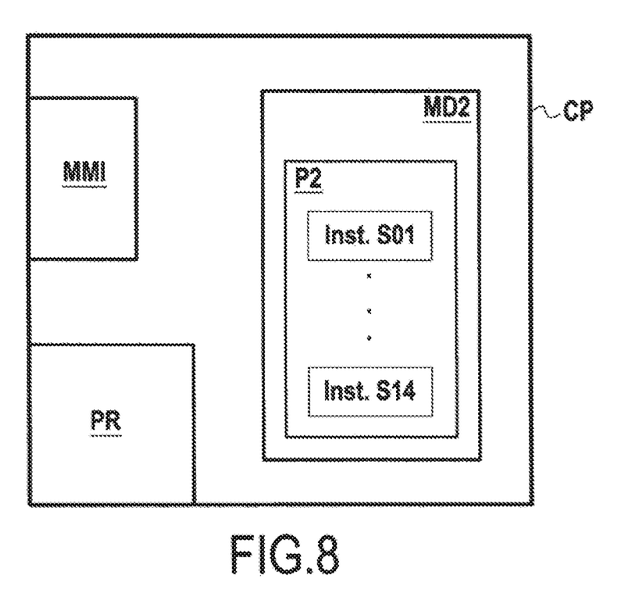
FIG. 8 schematically shoe computer comprising example computer program.

FIG. 8 schematically shows a computer CP comprising a computer program P2 supplied on a medium MD2 readable by the computer. The computer CP further comprises a man-machine interface MMI and a processor PR configured to execute the program P2. The program P2 comprises instructions Inst. for carrying out the steps S01 to S14 of the method described in relation with FIG. 5. The program is preferably stored in a non-transitory manner on the medium MD2.

It may be noted that while the method of FIG. 2 was described in relation with the correlation engine CE-1 of FIG. 1, and while the method of FIG. 5 was described in relation with the correlation engines CE-2, CE-3 of FIGS. 2 and 3, that these methods are applicable to all the correlation engine examples provided in this description.

The term "alarm" should be Interpreted broadly as an event notification of an event pertaining to the element, and not necessarily one having a negative impact. It may also merely be related to a state of the element.

Although certain examples of correlation engines have been described, it is to be understood that changes and additions may be made to the described examples within the scope of the appended claims.

In particular, reference to "an" or "a" section, alarm, block, module, result etc. should not be taken as referring to only one item.

The term "network sections" should be interpreted broadly as domain, infrastructure, layer, element, etc.

The invention claimed is:

1. A method comprising:
providing a correlation engine comprising a stack of at least two event analysis blocks, each event analysis block comprising at least:
a root cause analysis module to:
receive on input an event notification; and
supply on output a root cause analysis result; and
a service analysis module to:
receive on input the root cause analysis result from the root cause analysis module of the block; and
supply, on output, a service impact analysis result;
coupling each of the at least two event analysis blocks to a different network section of a telecommunications network to supply at least one event notification upon detection of an event relating to each respective network section coupled to a respective event analysis block;
configuring the root cause analysis module and the service analysis module of each of the at least two event analysis blocks to:
analyze an event notification received from at least one of the coupled network sections; and
provide a root cause analysis result and a service impact analysis result; and
configuring the at least two event analysis blocks such that at least one of the root cause analysis result and/or the service impact analysis result supplied by a first event analysis block is provided on input to a second event analysis block.

2. The method according to claim 1, further comprising:
receiving an alarm on input to the root cause analysis module of an event analysis block;
supplying, by the root cause analysis module, a root result;

receiving, by the service analysis module of the event analysis block, the root result; and supplying, by the service analysis module, a service impact analysis result.

3. The method according to claim 1, further comprising:

receiving an alarm on input to the root cause analysis module of the first event analysis block;

supplying, by the root cause analysis module, a root result;

receiving, by the service analysis module of the first event analysis block, the root result;

supplying, by the service analysis module, a service impact analysis result; and receiving, by at least one root cause analysis module or service impact analysis module, a root cause analysis result or service impact analysis result supplied by the second event analysis block.

4. The method according to claim 1, wherein:

the root cause analysis module of each event analysis block further:

receives on input a root cause analysis result from a root cause analysis module of an event analysis block arranged in a first direction; and supplies on output its root cause analysis result to a root cause analysis module of an event analysis block arranged in a second direction, opposite to the first; and the service analysis module of each event analysis block further:

receives on input a service impact analysis result from a service impact module of an event analysis block arranged in the second direction; and supplies on output its service impact analysis result to a service impact analysis module of an event analysis block arranged in the first direction.

5. The method according to claim 4, wherein the first direction corresponds to increasingly logically defined event analysis blocks, and the second direction corresponds to increasingly physically defined event analysis blocks.

6. The method according to claim 4, wherein the root cause analysis result or the service impact analysis result is supplied to more than one other event analysis block.

7. A non-transitory computer-readable medium having stored thereon a computer program comprising instructions, that, when executed by a computer, cause the computer to:

provide a correlation engine comprising a stack of at least two event analysis blocks, each event analysis block comprising at least:

a root cause analysis module to:

receive on input an event notification; and supply on output a root cause analysis result; and a service analysis module to:

receive on input the root cause analysis result from the root cause analysis module of the block; and supply on output a service impact analysis result;

couple each of the two event analysis blocks to a different network section of a telecommunications network to supply at least one event notification upon detection of an event relating to each respective network section; and configure the root cause analysis module and the service analysis module of each of the at least two event analysis blocks to:

analyze an event notification received from the respective network sections; and provide a root cause analysis result and a service impact analysis result.

8. The non-transitory computer-readable medium according to claim 7, wherein:

the root cause analysis module of each event analysis block further:

receives on input a root cause analysis result from a root cause analysis module of an event analysis block arranged in a first direction; and supplies on output its root cause analysis result to a root cause analysis module of an event analysis block arranged in a second direction, opposite to the first; and the service analysis module of each event analysis block further:

receives on input a service impact analysis result from a service impact module of an event analysis block arranged in the second direction; and supplies on output its service impact analysis result to a service impact analysis module of an event analysis block arranged in the first direction.

9. The non-transitory computer-readable medium according to claim 8, wherein the root cause analysis result or the service impact analysis result is supplied to more than one other event analysis block.

10. The non-transitory computer-readable medium according to claim 8, wherein the first direction corresponds to increasingly logically defined event analysis blocks, and the second direction corresponds to increasingly physically defined event analysis blocks.

11. A network correlation engine to be coupled to a telecommunication network comprising:

a stack of at least two event analysis blocks, each event analysis block comprising at least:

a root cause analysis module to:

receive, on input, an event notification; and supply, on output, a service impact analysis result; and a service analysis module to:

receive, on input a root cause analysis result from the root cause analysis module of the block; and supply, on output, a service impact analysis result, wherein the at least two event analysis blocks are coupled to a different network section of the telecommunications network to supply at least one event notification upon detection of an event relating to each respective network section coupled to a respective event analysis block, and wherein, the at least two event analysis blocks are configured to:

analyze an event notification received from at least one of the coupled network sections; and provide a root cause analysis result and a service impact analysis result; and wherein the at least two event analysis blocks are configured such that at least one of the root cause analysis result and/or the service impact analysis result supplied by a first event analysis block is provided on input to a second event analysis block.

12. The network correlation engine according to claim 11, wherein:

the root cause analysis module of each event analysis block further:

receives on input a root cause analysis result from a root cause analysis module of an event analysis block arranged in a first direction; and supplies on output its root cause analysis result to a root cause analysis module of an event analysis block arranged in a second direction, opposite to the first; and the service analysis module of each event analysis block further:

receives on input a service impact analysis result from a service impact module of an event analysis block arranged in the second direction; and supplies on output its service impact analysis result to a service impact analysis module of an event analysis block arranged in the first direction.

13. The network correlation engine according to claim 12, wherein the first direction corresponds to increasingly logically defined event analysis blocks, and the second direction corresponds to increasingly physically defined event analysis blocks.

14. The network correlation engine according to claim 12, wherein the root cause analysis result or the service impact analysis result is supplied to more than one other event analysis block.

15. The network correlation engine according to claim 12, wherein at least one event analysis block receives event notifications from more than one of the at least two network sections.

16. The network correlation engine according to claim 12, wherein at least one event analysis block receives more than one event notifications from one of the at least two network sections.

17. The network correlation engine according to claim 12, wherein at least one event analysis block comprises more than one root cause analysis module and/or service analysis module.

18. The network correlation engine according to claim 11, wherein the service impact analysis result is supplied to a man-machine interface.

19. The network correlation engine according to claim 18, wherein the man-machine interface is a graphical display used to monitor a status of the telecommunication network and of the correlation engine.

\* \* \* \* \*